(12) United States Patent
Suzuki et al.

(10) Patent No.: US 11,356,571 B2
(45) Date of Patent: Jun. 7, 2022

(54) DISPLAY APPARATUS AND NON-TRANSITORY COMPUTER READABLE MEDIUM FOR PREVENTING EXECUTION OF PROCESSING UNRELATED TO SITUATION OF PREPARATION OF PROCESSING

(71) Applicant: FUJIFILM Business Innovation Corp., Tokyo (JP)

(72) Inventors: Koichi Suzuki, Kanagawa (JP); Kazutoshi Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 172 days.

(21) Appl. No.: 16/566,899

(22) Filed: Sep. 11, 2019

(65) Prior Publication Data
US 2020/0099805 A1 Mar. 26, 2020

(30) Foreign Application Priority Data
Sep. 20, 2018 (JP) .............................. JP2018-176377

(51) Int. Cl.
*H04N 1/00* (2006.01)
*G06F 3/12* (2006.01)
*G06K 15/02* (2006.01)

(52) U.S. Cl.
CPC ......... *H04N 1/00413* (2013.01); *G06F 3/124* (2013.01); *G06F 3/1291* (2013.01); *G06K 15/1859* (2013.01); *H04N 1/00222* (2013.01)

(58) Field of Classification Search
CPC .......... H04N 1/00413; H04N 1/00222; H04N 1/00949; G06F 3/124; G06F 3/1291; G06F 3/121; G06F 3/1258; G06K 15/1859
See application file for complete search history.

(56) References Cited

U.S. PATENT DOCUMENTS

2016/0261766 A1* 9/2016 Tsunekawa ............ H04N 1/233

FOREIGN PATENT DOCUMENTS

| JP | 2010098589 | 4/2010 |
| JP | 2011233175 | 11/2011 |
| JP | 2015114915 | 6/2015 |
| JP | 2016006667 | 1/2016 |

* cited by examiner

*Primary Examiner* — Juan M Guillermety
(74) *Attorney, Agent, or Firm* — JCIPRNET

(57) ABSTRACT

A display apparatus include: a displayer that displays on a screen at least one image used for an operation to instruct execution of processing under a predetermined condition; a preparation detector that detects preparation performed by a user for the processing; and a disabling unit that disables a non-target image used for an operation to instruct execution of non-target processing different from target processing corresponding to a result of detection of the preparation detector, the non-target image being of the at least one image displayed on the screen.

13 Claims, 6 Drawing Sheets

DISPLAY APPARATUS AND
NON-TRANSITORY COMPUTER READABLE
MEDIUM FOR PREVENTING EXECUTION
OF PROCESSING UNRELATED TO
SITUATION OF PREPARATION OF
PROCESSING

CROSS-REFERENCE TO RELATED
APPLICATIONS

This application is based on and claims priority under 35 USC 119 from Japanese Patent Application No. 2018-176377 filed Sep. 20, 2018.

BACKGROUND (i) Technical Field

The present disclosure relates to a display apparatus and a non-transitory computer readable medium.

(ii) Related Art

A technique is known which restricts the operation of a user in a user interface of a processing device according to a situation. For instance, Japanese Unexamined Patent Application Publication No. 2010-98589 describes a technique in which when a certain period of time or longer elapses with no operation performed, it is determined that an erroneous operation has been performed, and a deletion shortcut key is disabled.

SUMMARY

The processing executed by a processing device includes copy processing, print processing, scan processing, and facsimile processing which need setting. As one of the methods to operate a processing device which executes the above-mentioned processing, display of an operation image (hereinafter, referred to as a "simple operation image") allowing processing to be performed under conditions set by a simple operation has been proposed. The simple operation image includes a simple operation image (hereinafter, referred to as a "simple operation image for non-immediate start") in which when the simple operation image is pressed, processing is started after confirming with a user that processing is started, and a simple operation image (hereinafter, referred to as a "simple operation image for immediate start") in which when the simple operation image is pressed, processing is started without confirming with a user that processing is started. Unlike a simple operation image for non-immediate start and a normal operation image, a simple operation image for immediate start is such that when pressed, processing is started immediately. Thus, when a user accidentally touches a simple operation image for immediate start, processing not intended by the user may be executed.

Aspects of non-limiting embodiments of the present disclosure relate to preventing processing unrelated to the situation of preparation of processing by a user from being executed due to an erroneous operation of a user.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a display apparatus including: a displayer that displays on a screen at least one image used for an operation to instruct execution of processing under a predetermined condition; a preparation detector that detects preparation performed by a user for the processing; and a disabling unit that disables a non-target image used for an operation to instruct execution of non-target processing different from target processing corresponding to a result of detection of the preparation detector, the non-target image being of the at least one image displayed on the screen.

BRIEF DESCRIPTION OF THE DRAWINGS

Exemplary embodiments of the present disclosure will be described in detail based on the following figures, wherein.

DETAILED DESCRIPTION

1. First Embodiment 1.1. Configuration

Figure 1:
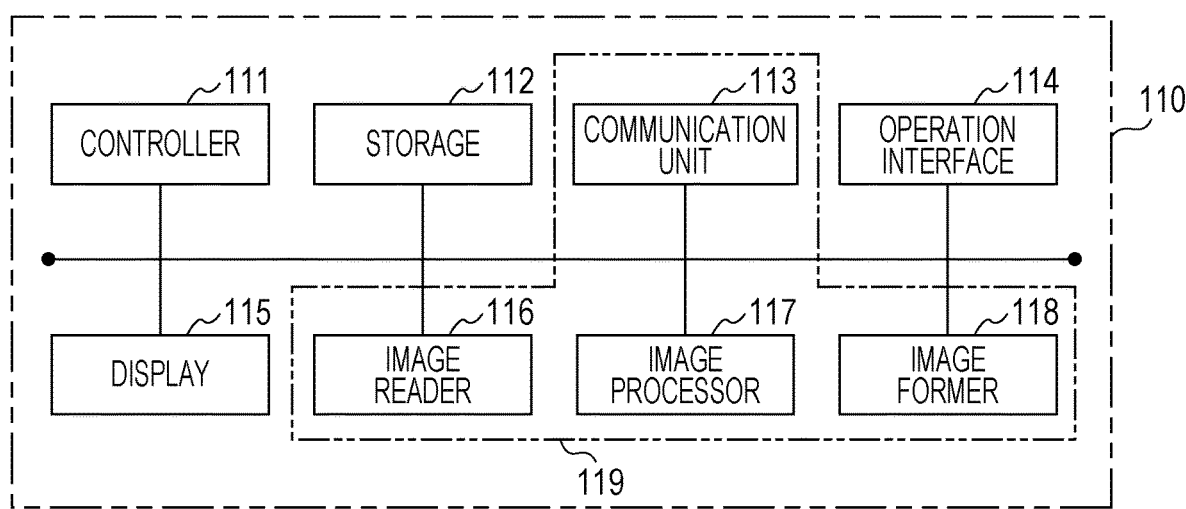
FIG. 1 is a diagram illustrating an example of the hardware configuration of an image processing apparatus according to a first exemplary embodiment.

FIG. 1 is a diagram illustrating an example of the hardware configuration of an image processing apparatus 110 according to a first exemplary embodiment. The image processing apparatus 110 is a device having multiple functions such as a print function, a copy function, a scan function, and a facsimile function.

The image processing apparatus 110 includes a controller 111, a storage 112, a communication unit 113, an operation interface 114, a display 115, an image reader 116, an image processor 117, and an image former 118. The controller 111 controls the components of the image processing apparatus 110. For instance, a processor such as a central processing unit (CPU), and a memory such as a read only memory (ROM) and a random access memory (RAM) may be used in the controller 111. The storage 112 stores various data and programs. For instance, a hard disk drive may be used as the storage 112. The communication unit 113 is a communication interface connected to a communication line. The communication unit 113 performs communication via a communication line. The operation interface 114 is used for input of various types of information by an operation of a user. For instance, an operation key and a touch panel may be used as the operation interface 114. The display 115 displays various images. For instance, a liquid crystal display may be used as the display 115.

The image reader 116 reads the image of a document and converts the image into image data. For instance, an image scanner may be used as the image reader 116. The image processor 117 performs various types of image processing, such as color correction or gradation correction, on the image data inputted from the communication unit 113 or the image reader 116. The image former 118 forms an image according to the image data on a recording medium such as a sheet of paper. For instance, a printer using an electrophotographic system may be used as the image former 118.

Print processing is processing that forms an image according to the image data on a medium. The print processing is performed by cooperation of the communication unit 113, the image processor 117, and the image former 118. Copy processing is processing that copies the image of a document on a medium. The copy processing is performed by cooperation of the image reader 116, the image processor 117, and the image former 118. Scan processing is processing that reads the image of a document and converts the image into image data. The scan processing is performed by cooperation of the image reader 116 and the image processor 117. Facsimile processing is processing that transmits image data which shows the image of a document. The facsimile processing is performed by cooperation of the image reader 116, the image processor 117, and the communication unit 113. In the following description, the communication unit 113, the image reader 116, the image processor 117, and the image former 118 which perform the above-mentioned processing may be collectively referred to as a "processor 119".

Figure 2:
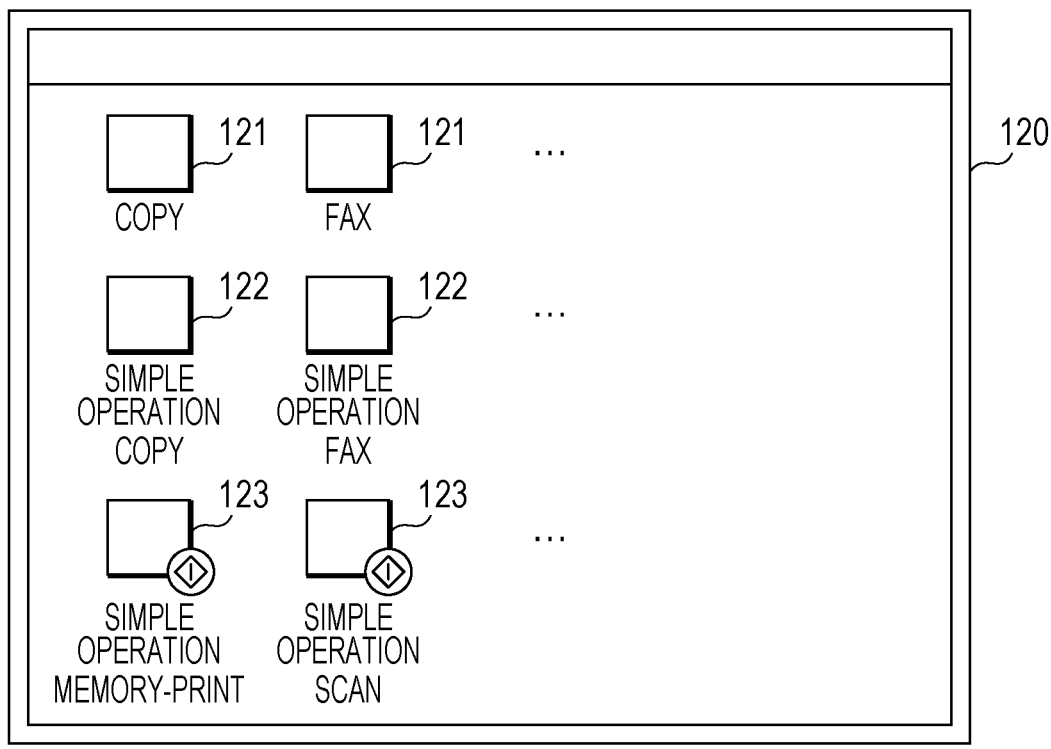
FIG. 2 is a view illustrating an example of a menu screen displayed on a display.

FIG. 2 is a view illustrating an example of a menu screen 120 displayed on the display 115. The menu screen 120 is used by a user for selecting desired processing from multiple types of processing to be executed by the image processing apparatus 110. The menu screen 120 may be displayed, for instance, in response to login of a user to the image processing apparatus 110. Multiple types of processing executed by the image processing apparatus 110 include, for instance, the print processing, copy processing, scan processing, and facsimile processing described above. The print processing may include processing (hereinafter, referred to as "memory-print processing") of forming an image corresponding to image data read from an external flash memory such as a Universal Serial Bus (USB) flash drive. The scan processing may include processing (hereinafter, referred to as "scan-memory processing") of converting an image read from a document into image data and storing the image data in an external flash memory such as a USB flash drive. Furthermore, these types of processing may be divided into processing charged and processing not charged. Furthermore, these types of processing may be divided into processing not allowed to be executed unless user authentication is performed, and processing allowed to be executed even when no user authentication is performed.

The menu screen 120 contains normal operation images 121, simple operation images 122 for non-immediate start, and simple operation images 123 for immediate start. It is to be noted that the number of normal operation images 121, the number of simple operation images 122 for non-immediate start, and the number of simple operation images 123 for immediate start illustrated in FIG. 2 are only examples, and the present disclosure is not limited to the examples. The number of normal operation images 121, the number of simple operation images 122 for non-immediate start, and the number of simple operation images 123 for immediate start may be each a singular or plural number. In the following description, the normal operation images 121, the simple operation images 122 for non-immediate start, and the simple operation images 123 for immediate start may be collectively referred to as the "operation image". Also, the simple operation images 122 for non-immediate start, and the simple operation images 123 for immediate start may be collectively referred to as "simple operation image".

The normal operation images 121 are each an image used for an operation to instruct execution of processing. When a normal operation image 121 is pressed, a setting screen used for setting conditions of corresponding processing is displayed. After an operation of setting the conditions for processing is performed on the setting screen, when an operation to instruct start of the processing is performed, the processing is performed under the conditions set. In other words, when a normal operation image 121 is used, after pressing the normal operation image 121, in order to execute processing, a user is requested to perform an operation to set the conditions for the processing and an operation to instruct start of the processing.

The simple operation images 122 for non-immediate start are each an image used for an operation to instruct execution of processing under predetermined conditions. When a simple operation image 122 for non-immediate start is used, processing is executed by a simpler operation, as compared with when a normal operation image 121 is used. The simpler operation refers to that the number of steps of an operation is less, for instance. Specifically, each simple operation image 122 for non-immediate start is associated with predetermined conditions for processing. When the simple operation image 122 for non-immediate start is pressed, a confirmation screen for confirming that processing is started is displayed. At this point, the setting screen described above is not displayed. When an operation to instruct start of processing is performed on the confirmation screen, the processing is performed under the conditions set. In other words, when the simple operation image 122 for non-immediate start is used, after pressing the simple operation image 122 for non-immediate start, a user is requested to perform an operation to instruct start of processing to execute the processing. In this case, an operation to set the conditions for processing is not requested, thus the processing is executed by an operation with a less number of steps, as compared with when a normal operation image 121 is used.

The simple operation imaged 123 for immediate start are each an image used for an operation to instruct execution of processing under predetermined conditions. When a simple operation image 122 for non-immediate start is used, processing is executed by a simpler operation, as compared with when a normal operation image 121 is used or when a simple operation image 122 for non-immediate start is used. Specifically, each simple operation image 123 for immediate start is associated with predetermined conditions for processing. When the simple operation image 123 for immediate start is pressed, processing is performed under the conditions set. At this point, the setting screen and the confirmation screen described above are not displayed.

In other words, when the simple operation image 123 for immediate start is used, after pressing the simple operation image 123 for immediate start, a user is requested to perform no operation to execute processing. Therefore, the processing is executed by an operation with a less number of steps, as compared with when a normal operation image 121 is used or when a simple operation image 122 for non-immediate start is used.

Each simple operation image may be generated by a user. In this case, the simple operation image is associated with desired processing and conditions for the processing by an operation of a user. For instance, when facsimile data is frequently transmitted to the facsimile number, "03-xxxx-xxxx" by a user, a simple operation image may be generated, in which facsimile processing and the facsimile number, "03-xxxx-xxxx" as a facsimile transmission destination are associated with each other. However, conditions for processing associated with a simple operation image are limited to those included in the conditions for processing settable when a normal operation image 121 associated with the same processing is pressed. In other words, the conditions for these processing have an inclusive relationship. For instance, when a user is not authorized to transmit facsimile data to an overseas transmission destination in facsimile processing, the user is unable to generate a simple operation image associated with the overseas transmission destination.

Figure 3:
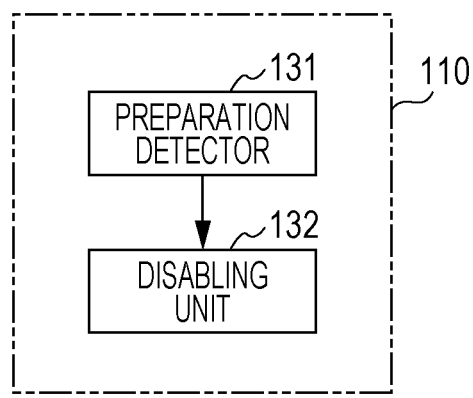
FIG. 3 is a diagram illustrating an example of the functional configuration of the image processing apparatus.

FIG. 3 is a diagram illustrating an example of the functional configuration of the image processing apparatus 110. The image processing apparatus 110 has a preparation detector 131 and a disabling unit 132. These functions are implemented through cooperation between a program stored in a memory and a processor that executes the program, and by the processor performing calculation or controlling communication by the communication unit 113.

The preparation detector 131 detects preparation for processing performed by a user. The preparation for processing may be made, for instance, by an operation or activity of a user performed on the image processing apparatus 110. For instance, the preparation for processing may be supplying objects or data required for processing to the image processing apparatus 110 by an operation or activity of a user. For instance, the preparation for processing may include at least one of installation of a document, insertion of an external flash memory, insertion of cash, input of information used for user authentication or reading of a recording medium on which the information is recorded, input of a print instruction, and storing of facsimile data. The facsimile data is data transmitted in the facsimile processing. The recording medium may be an integrated circuit (IC) card, for instance. The preparation detector 131 may be implemented by hardware which varies with a detection target. The hardware may include various sensors included in the image processing apparatus 110. For instance, when installation of a document is detected, the preparation detector 131 may be implemented by a sensor, provided in the image reader 116, which detects a document. When insertion of cash is detected, the preparation detector 131 may be implemented by a sensor, provided in a charging device, which detects cash.

The disabling unit 132 disables a simple operation image 123 for immediate start used for an operation to instruct execution of non-target processing different from target processing corresponding to a result of detection of the preparation detector 131, the simple operation image 123 being one of multiple simple operation images 123 for immediate start contained in the menu screen 120. For instance, when preparation for processing is detected, the target processing is processing considered to be performed according to the preparation. For instance, when preparation for processing is not detected, the target processing is processing other than the processing considered to be performed according to the preparation. In other words, the target processing is processing related to a situation of preparation performed by a user for processing. The non-target processing is processing other than the target processing of the processing executable by the image processing apparatus 110, for instance. In other words, the non-target processing is processing unrelated to a situation of preparation performed by a user for processing. Disabling of the simple operation image 123 for immediate start includes disabling of an operation using any simple operation image 123 for immediate start, and controlling display of the simple operation images 123 for immediate start to achieve a state in which each simple operation image 123 for immediate start does not receive any operation. In the first exemplary embodiment, an operation using any simple operation image 123 for immediate start is disabled. The "operation is disabled" refers to that even when an operation is performed, processing corresponding to the operation is not executed.

1.2. Operation

Figure 4:
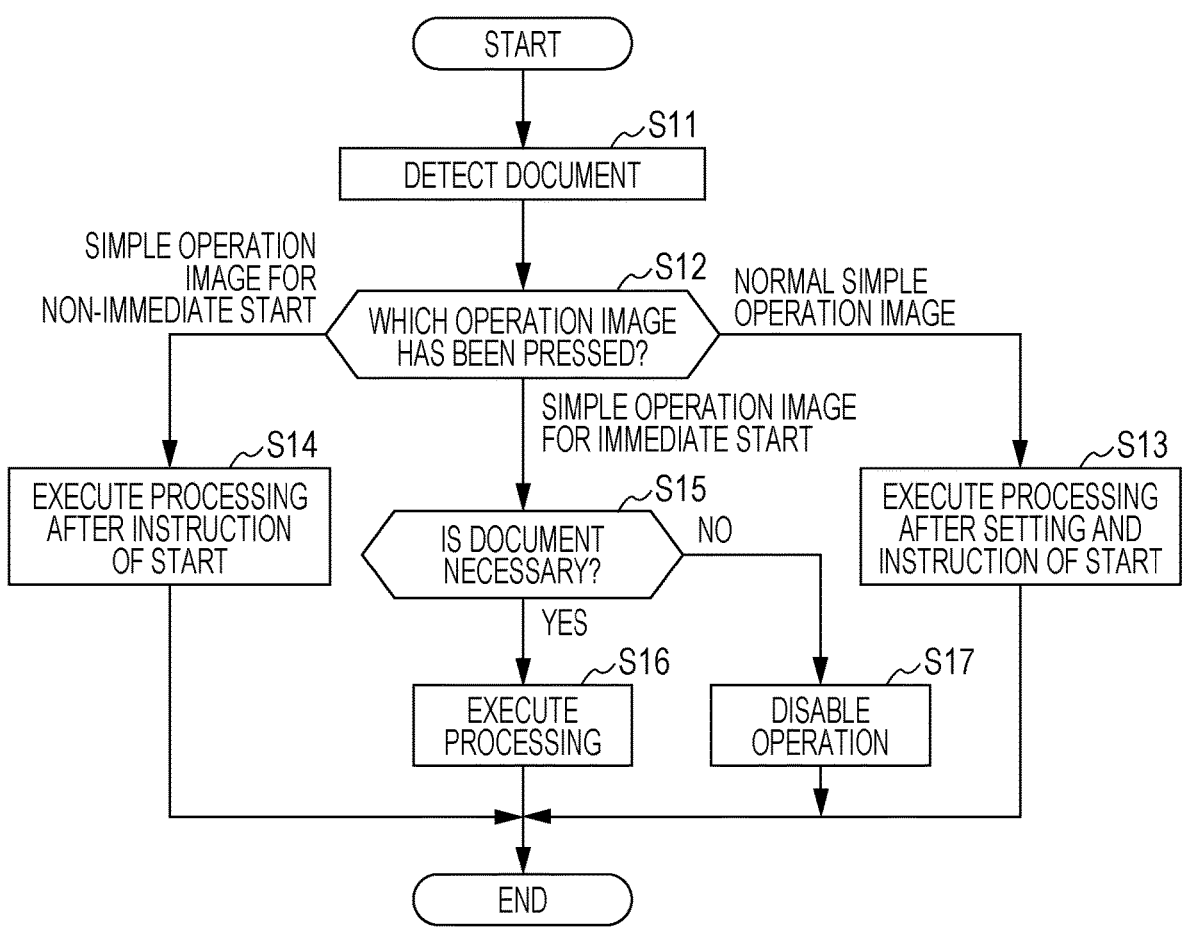
FIG. 4 is a flowchart illustrating an example of the operation of the image processing apparatus according to the first exemplary embodiment.

FIG. 4 is a flowchart illustrating an example of the operation of the image processing apparatus 110 according to the first exemplary embodiment. The start of the operation is triggered by preparation performed by a user for processing while the menu screen 120 is displayed on the display 115. Here, a situation is assumed in which a user sets a document on the image reader 116.

The preparation detector 131 detects a document set on the image reader 116 (step S11). After a document is detected, when an operation to press an operation image on the menu screen 120 is performed by a user, the disabling unit 132 determines the pressed operation image is which one of the normal operation images 121, the simple operation images 122 for non-immediate start, and the simple operation images 123 for immediate start (step S12).

When a normal operation image 121 is pressed (the determination in step S12 is "normal operation image"), after receiving an operation to set conditions for processing and an operation to instruct start of the processing, the processor 119 executes the processing under the conditions set (step S13). Specifically, for instance, when a normal operation image 121 corresponding to copy processing is pressed, a setting screen used for setting of the conditions for copy processing is displayed on the display 115. When a setting screen is displayed, a user performs an operation to set the conditions for copy processing using the operation interface 114. Subsequently, a user performs an operation to instruct start of the copy processing using the operation interface 114. For instance, when the operation interface 114 includes a start button used for an operation to instruct start of processing, the operation may be pressing the start button. When the operation is performed, a control signal is supplied to the image reader 116, the image processor 117, and the image former 118 to perform control to execute copy processing. The image reader 116, the image processor 117, and the image former 118 perform copy processing in accordance with the control signal under the conditions for processing which have been set on the setting screen.

When a simple operation image 122 for non-immediate start is pressed (the determination in step S12 is "simple operation image for non-immediate start"), after receiving an operation to instruct start of processing, the processing unit 119 executes processing under the conditions set (step S14). Specifically, for instance, when a simple operation image 122 for non-immediate start corresponding to copy processing is pressed, a confirmation screen for confirming that copy processing is started is displayed on the display 115. A user performs an operation to instruct start of copy processing using the operation interface 114. For instance, when a start button which receives an operation to instruct start of copy processing is contained in the confirmation screen, the operation may be pressing the start button. When the operation is performed, a control signal is supplied to the image reader 116, the image processor 117, and the image former 118 to perform control to execute copy processing. The image reader 116, the image processor 117, and the image former 118 perform copy processing in accordance with the control signal under the conditions for processing which are associated with the pressed simple operation image 122 for non-immediate start.

When a simple operation image 123 for immediate start is pressed (the determination in step S12 is "simple operation image for immediate start"), the disabling unit 132 determines whether or not processing corresponding to the simple operation image 123 for immediate start needs a document (step S15). Target processing which needs a document is, for instance, scan processing, copy processing, or facsimile processing. On the other hand, non-target processing which needs no document is, for instance, print processing. Memory-print processing is included in the print processing. For instance, when processing corresponding to a simple operation image 123 for immediate start is scan processing, the determination in step S15 is YES. In this case, the processor 119 executes the processing under the conditions set without waiting for a further operation of a user (step S16). In this case, a control signal is supplied to the image reader 116 and the image processor 117 to perform control to execute scan processing. The image reader 116 and the image processor 117 perform scan processing in accordance with the control signal under the conditions for processing which are associated with the pressed simple operation image 123 for immediate start.

For instance, when processing corresponding to the simple operation image 123 for immediate start is memory-print processing, the determination in step S15 is NO because the memory-print processing needs no document. In this case, the disabling unit 132 disables the operation to press the simple operation image 123 for immediate start (step S17). Specifically, the disabling unit 132 does not supply a control signal to perform control to execute print processing corresponding to the simple operation image 123 for immediate start in response to the pressing of the simple operation image 123 for immediate start. Therefore, even when a simple operation image 123 for immediate start is pressed, memory-print processing corresponding to the simple operation image 123 for immediate start is not executed.

When a user sets a document and an operation using an operation image corresponding to target processing which needs no document is performed, the operation may be an erroneous operation. When a normal operation image 121 or a simple operation image 122 for non-immediate start is pressed, processing is not executed unless a further operation is performed by a user, and thus a user may notice an erroneous operation before processing is executed, and may cancel the processing. However, when a simple operation image 123 for immediate start is pressed, processing is executed without waiting for a further operation of a user, and thus processing not intended by a user may be executed as it is. Therefore, in this situation, even when a simple operation image 123 for immediate start is pressed, processing corresponding to the simple operation image 123 for immediate start is not executed, and thus processing not intended by a user is prevented from being executed.

Figure 5:
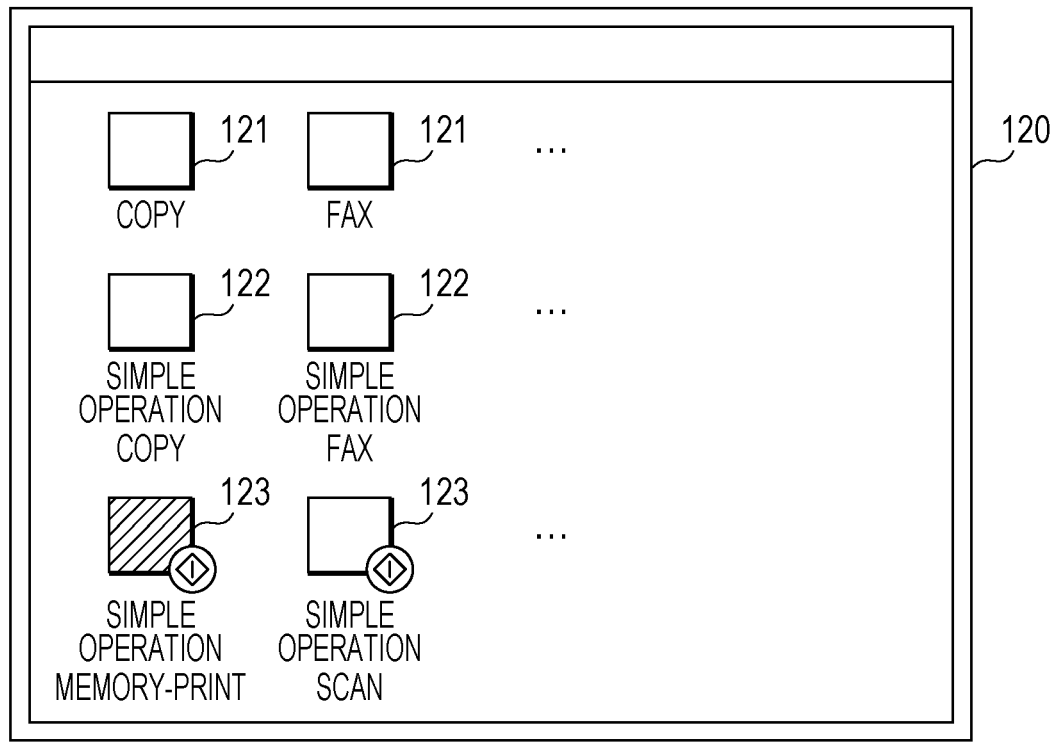
FIG. 5 is a view illustrating an example of display of a simple operation image for immediate start.

When the determination in step S15 described above is NO, a simple operation image 123 for immediate start corresponding to memory-print processing may be displayed distinctively from other simple operation images 123 for immediate start. For instance, as illustrated in FIG. 5, the color of the simple operation image 123 for immediate start corresponding to memory-print processing may be changed. In other examples, the shape, size, and the manner of display (such as blinking) of the simple operation image 123 for immediate start corresponding to memory-print processing may be changed, or an additional image may be added to the simple operation image 123 for immediate start.

In the first exemplary embodiment described above, the image processing apparatus 110, the simple operation image 123 for immediate start corresponding to scan processing, and the simple operation image 123 for immediate start corresponding to memory-print processing are respectively used as the display apparatus, the target image, and the non-target image according to the present disclosure.

According to the first exemplary embodiment described above, an operation of a simple operation image 123 for immediate start corresponding to non-target processing unrelated to the situation of preparation performed by a user for processing is disabled, thus even when a user accidentally performs an operation using a simple operation image 123 for immediate start, the non-target processing is not executed. In other words, the non-target processing is prevented from being executed due to an erroneous operation of a user. When a simple operation image 123 for immediate start, in which an operation is disabled, is displayed distinctively from other simple operation images 123 for immediate start, the simple operation image 123 for immediate start in which an operation of a user is disabled is recognized.

2. Second Exemplary Embodiment

In the first exemplary embodiment described above, when non-target processing is associated with a simple operation image 123 for immediate start pressed by a user, an operation using the simple operation image 123 for immediate start is disabled. In contrast, in the second exemplary embodiment, in this situation, display of the simple operation image 123 for immediate start is controlled to achieve a state in which the simple operation image 123 for immediate start does not receive any operation. A method of controlling display may be hiding the simple operation image 123 for immediate start or the simple operation image 123 for immediate start may be displayed in a state which does not allow pressing. The state which does not allow pressing may be, for instance, what is called a gray-out state. It is to be noted that the configuration of the image processing apparatus 110 according to the second exemplary embodiment is the same as the configuration of the image processing apparatus 110 described in the first exemplary embodiment, and thus a description is omitted.

Figure 6:
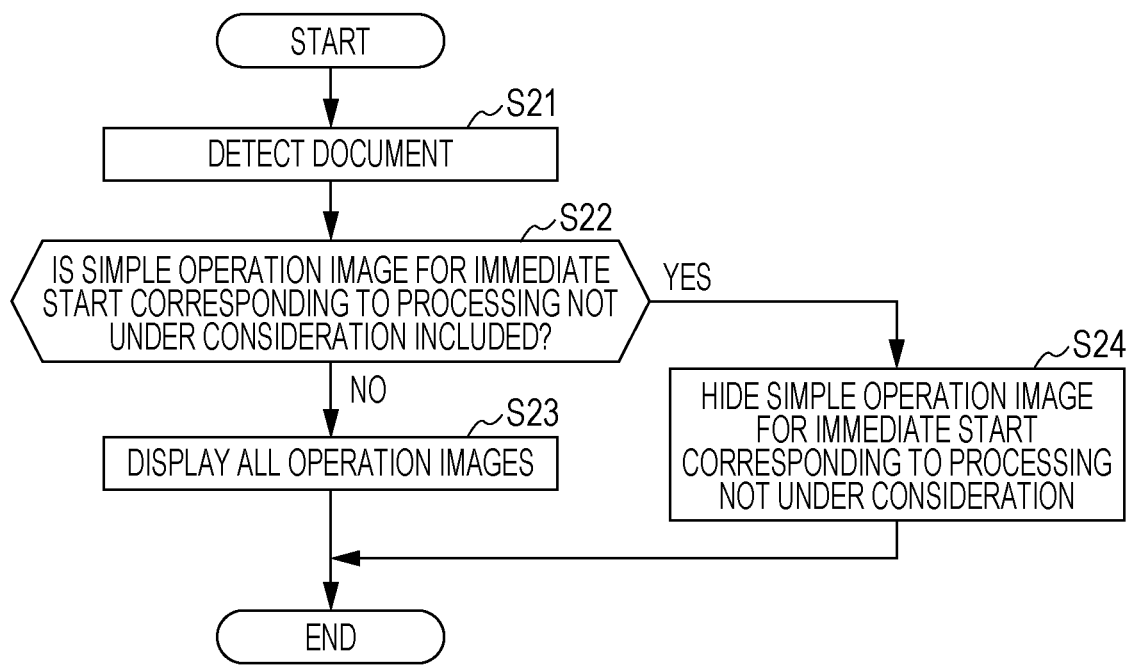
FIG. 6 is a flowchart illustrating an example of the operation of an image processing apparatus according to a second exemplary embodiment.

FIG. 6 is a flowchart illustrating an example of the operation of the image processing apparatus 110 according to the second exemplary embodiment. The start of the operation is triggered by preparation performed by a user for processing while the menu screen 120 is displayed on the display 115. Here, a situation is assumed in which a user sets a document on the image reader 116.

The preparation detector 131 detects a document set on the image reader 116 (step S21). When a document is detected, the disabling unit 132 determines whether or not a simple operation image 123 for immediate start corresponding to non-target processing which needs no document is contained in the menu screen 120 (step S22). When such as a simple operation image 123 for immediate start is not contained in the menu screen 120 (the determination in step S22 is NO), all the operation images contained in the menu screen 120 are displayed (step S23). On the other hand, for instance, when a simple operation image 123 for immediate start corresponding to scan-memory processing which needs no document is contained in the menu screen 120, the determination in step S22 is YES. In this case, the disabling unit 132 hides the simple operation image 123 for immediate start (step S24).

Figure 7:
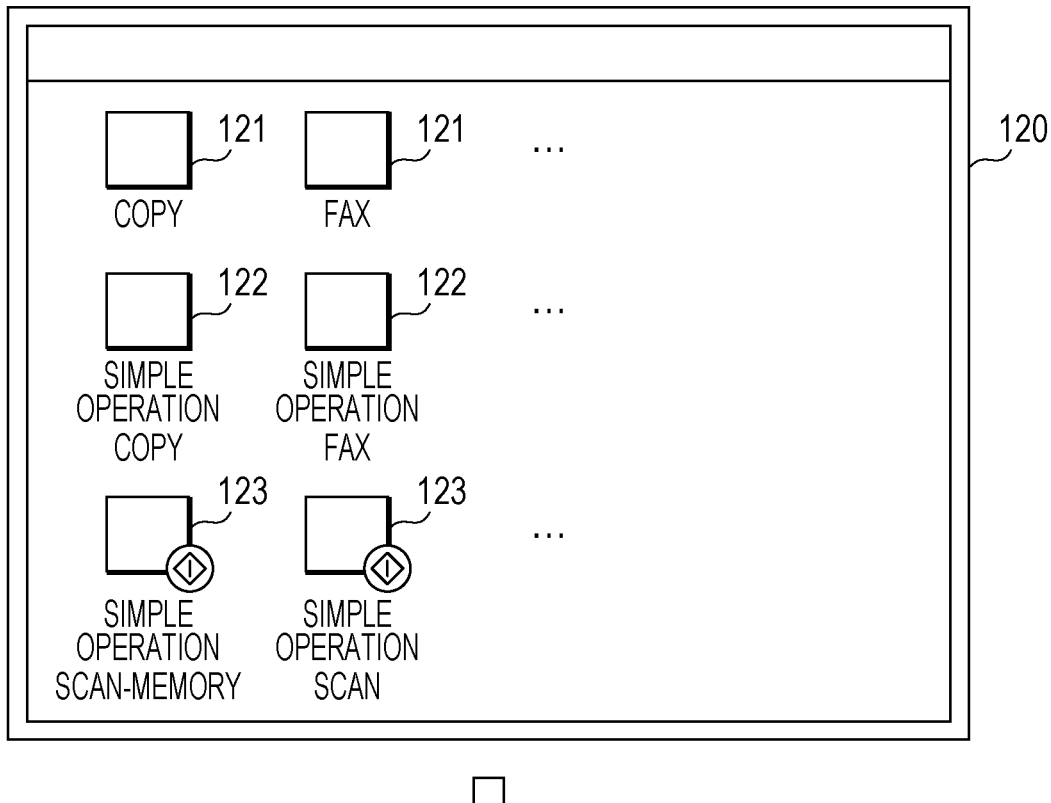
FIG. 7 is a view illustrating an example of a menu screen according to the second exemplary embodiment.
Figure 7:
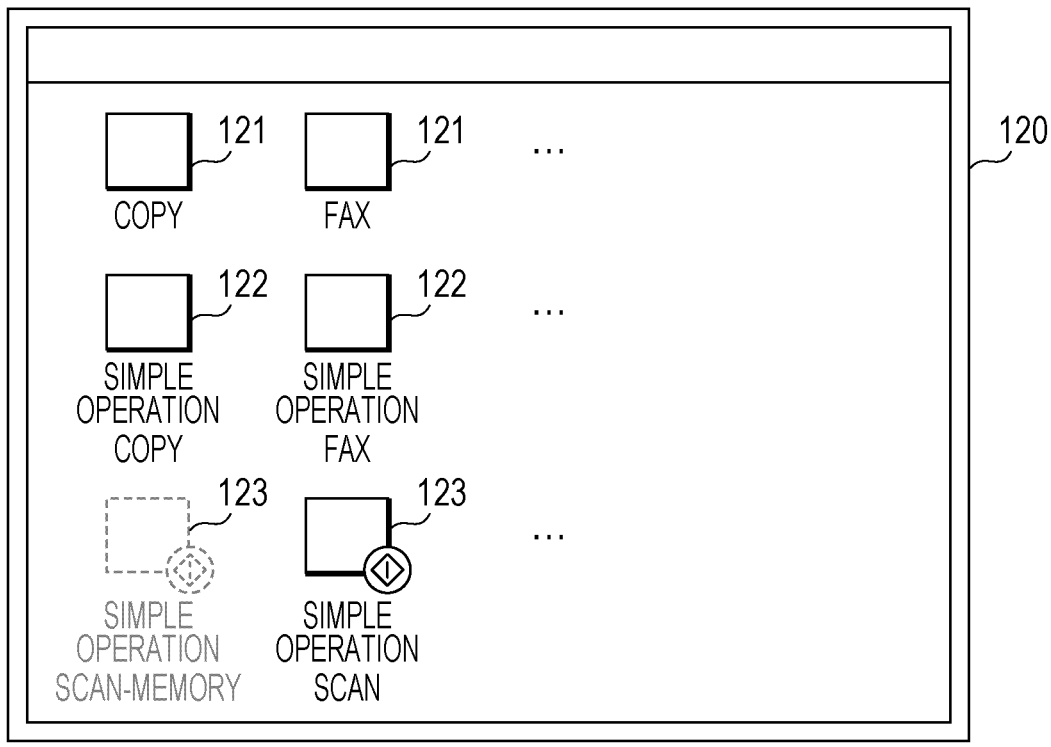

FIG. 7 is a view illustrating an example of the menu screen 120 according to the second exemplary embodiment. In this example, the simple operation image 123 for immediate start corresponding to scan-memory processing is hidden. As described above, when a user sets a document, and an operation using an operation image corresponding to processing which needs no document is performed, the operation may be an erroneous operation. However, as illustrated in FIG. 7, an operation by a user using the simple operation image 123 for immediate start is prevented by hiding the simple operation image 123 for immediate start corresponding to non-target processing which needs no document.

When the determination in step S22 described above is YES, a message indicating that a simple operation image 123 for immediate start corresponding to scan-print processing is going to be hidden is displayed, then the processing in step S24 may be performed. For instance, on the menu screen 120, a message indicating that a simple operation image 123 for immediate start corresponding to scan-print processing is going to be hidden may be displayed. This is because when the simple operation image 123 for immediate start corresponding to scan-print processing is suddenly hidden without any notification, particularly a user who wants to use the simple operation image 123 for immediate start may be confused.

In the second exemplary embodiment, the image processing apparatus 110, and the simple operation image 123 for immediate start corresponding to scan-memory processing are respectively used as the display apparatus, and the non-target image according to the present disclosure.

According to the second exemplary embodiment described above, display of any simple operation image 123 for immediate start used for an operation to instruct execution of non-target processing is controlled to be prevented from being pressed, the non-target processing being unrelated to the situation of preparation performed by a user for processing. Thus an operation accidentally using the simple operation image 123 for immediate start is prevented. When a message is displayed indicating that each simple operation image 123 for immediate start corresponding to non-target processing is going to be hidden, then the simple operation image 123 for immediate start is hidden, the simple operation image 123 for immediate start hidden from the user is recognized.

3. Modification

The first exemplary embodiment and the second exemplary embodiment described above are each an example of the present disclosure. The present disclosure is not limited to the first exemplary embodiment and the second exemplary embodiment described above. For instance, the first exemplary embodiment and the second exemplary embodiment described above may be modified as follows. Alternatively, the following two or more modifications may be combined and carried out.

3.1. First Modification

Figure 8:
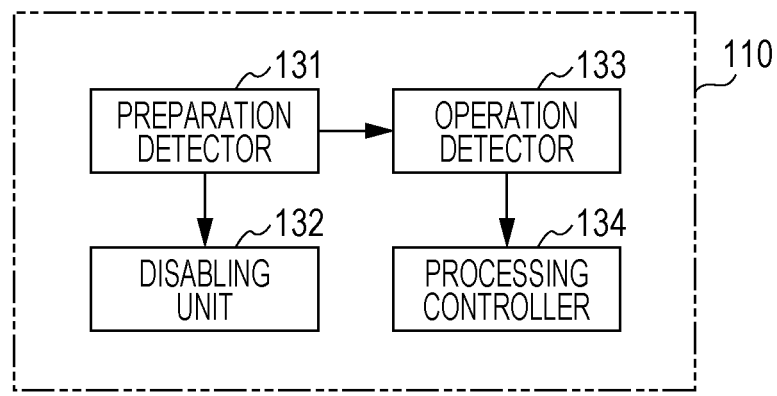
FIG. 8 is a diagram illustrating an example of the functional configuration of an image processing apparatus according to a modification.

In the first exemplary embodiment and the second exemplary embodiment described above, the steps until target processing is performed may be changed according to the situation of an operation of a user until an operation using the simple operation image 123 for immediate start corresponding to the target processing is performed. In this case, as illustrated in FIG. 8, the image processing apparatus 110 has an operation detector 133 and a processing controller 134 in addition to the functions illustrated in FIG. 3. The operation detector 133 detects the situation of an operation of a user until an operation using the simple operation image 123 for immediate start corresponding to the target processing is performed. For instance, the situation of the operation allows to determine whether a user has performed an operation using a simple operation image 123 for immediate start with intention. The situation of the operation may be, for instance, the elapsed time until the operation is performed since detection of preparation for processing by the preparation detector 131, or may be the number of operations to redraw the screen, for instance, the number of operations to scroll the screen during a period until the operation is performed since detection of preparation for processing by the preparation detector 131. The processing controller 134 changes the steps until the target processing is executed according to the operation using the simple operation image 123 for immediate start corresponding to target processing, based on the situation of an operation detected by the operation detector 133. For instance, when the elapsed time or the number of operations to scroll the screen satisfies a predetermined condition, the steps may be changed. The condition indicates that a user is no longer considered to have pressed the simple operation image 123 for immediate start with intention. In another viewpoint, the condition implies that a user hesitated in selecting a simple operation image 123 for immediate to be selected. For instance, the condition may be that the elapsed time is greater than or equal to a predetermined time or that the number of operations is greater than or equal to a predetermined number. As an example using other than the elapsed time or the number of operations, the condition may be that page transition of moving forward or backward is made multiple times in a short time. A method to change steps, for instance, may be a method of changing the operation requested to a user until processing is executed. For instance, when a simple operation image 123 for immediate start corresponding to target processing is pressed, similarly to when the simple operation image 122 for non-immediate start in the above-described exemplary embodiment is pressed, a confirmation screen is displayed, and after an operation to instruct start of processing is performed in the confirmation screen, target processing may be started. A target to be changed based on the situation of the operation is not limited to the steps until target processing is executed. As a method other than the method to change the steps, for instance, there is a method of changing a display format such as displaying a characteristic setting value.

Figure 9:
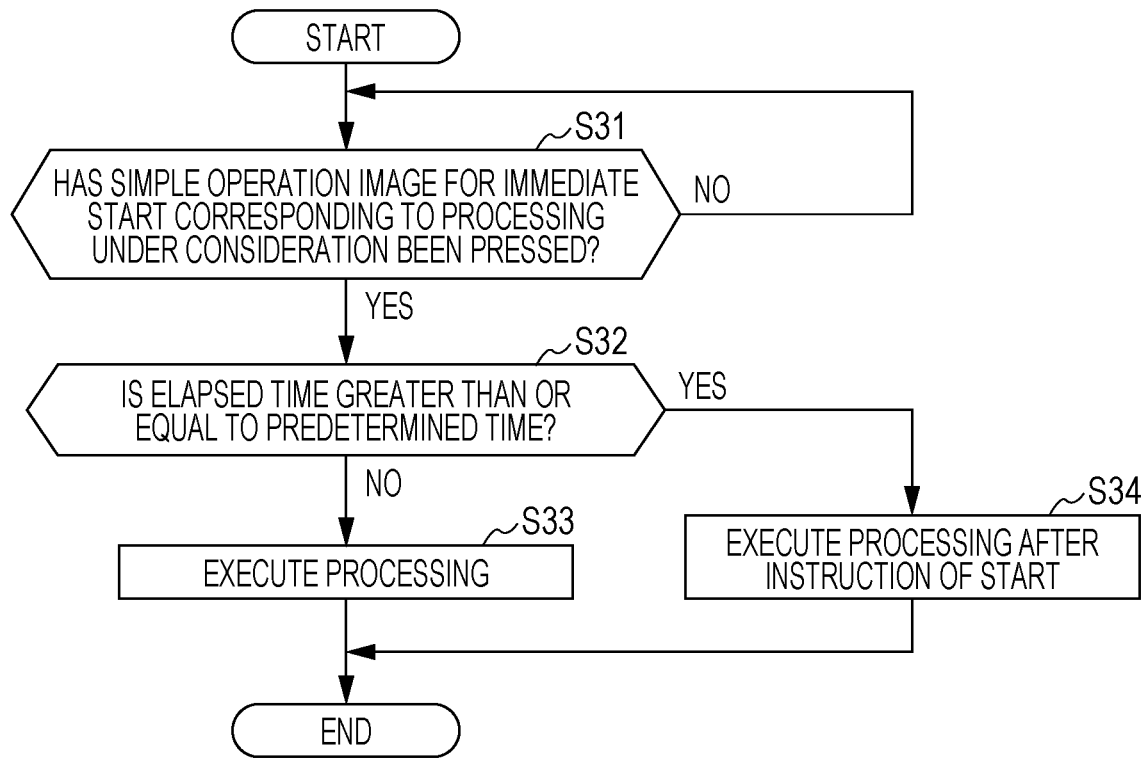
FIG. 9 is a flowchart illustrating an example of the operation of the image processing apparatus according to the modification.

FIG. 9 is a flowchart illustrating an example of the operation of the image processing apparatus 110 according to the modification. The start of the operation is triggered by pressing a simple operation image 123 for immediate start by a user, corresponding to target processing which needs a document after a document is detected as in step S11 or S21 described above. When a simple operation image 123 for immediate start corresponding to target processing is pressed by a user (the determination in step S31 is YES), the disabling unit 132 determines whether or not the elapsed time until the simple operation image 123 for immediate start is pressed since detection of a document is greater than or equal to a predetermined time (step S32). When the time is less than the predetermined time (the determination in step S32 is NO), similarly to step S16 described above, the processor 119 executes the processing under the conditions set without waiting for a further operation of a user (step S33). On the other hand, when the time is greater than or equal to than the predetermined time (the determination in step S32 is YES), similarly to step S14 described above, the processor 119 receives an operation to instruct start of processing, then executes the processing under the conditions set (step S34). This is because even when a simple operation image 123 for immediate start corresponding to target processing is pressed, for instance, if it takes time for a user to press a simple operation image 123 for immediate start after setting a document, it is often the case that a user wanted to check the contents of processing before the processing is executed because the user hesitated in selecting a simple operation image 123 for immediate, or although a user presses a simple operation image 123 for immediate start for a trial as a result of hesitation, the operation may be an erroneous operation. In the modification, a simple operation image 123 for immediate start corresponding to target processing is used as the target image according to the present disclosure. According to the modification, even for an operation using a simple operation image 123 for immediate start corresponding to target processing, when there is a possibility that a user hesitates in performing the operation, the target processing is executed by steps different from normal case.

3.2. Second Modification

In the first exemplary embodiment and the second exemplary embodiment described above, while a user performs an operation to redraw the screen of the display 115, an operation using a simple operation image 123 for immediate start may be disabled. The operation to redraw the screen by a user is, for instance, an operation to scroll the screen. The operation may be detected, for instance, by a touch panel included in the operation interface 114. While the screen is scrolled by an operation of a user, the disabling unit 132 disables the operation using any simple operation image 123 for immediate start. In this situation, the simple operation image 123 for immediate start in which the operation is disabled includes both the simple operation image 123 for immediate start corresponding to target processing and the simple operation images 123 for immediate start corresponding to non-target processing. According to the modification, even when a user accidentally performs an operation using a simple operation image 123 for immediate start while performing an operation to scroll the screen, processing corresponding to the simple operation image 123 for immediate start is prevented from being executed.

3.3. Third Modification

In the first exemplary embodiment and the second exemplary embodiment described above, target processing and non-target processing are not limited to processing which needs a document and processing which needs no document, respectively. For instance, when the preparation detector 131 detects an external flash memory, target processing corresponding to the detection result provides scan-memory processing and memory-print processing, and non-target processing may be processing other than the scan-memory processing and the memory-print processing. In another example, when the preparation detector 131 detects insertion of cash, target processing corresponding to the detection result may be processing charged, and non-target processing may be processing not charged. In another example, when the preparation detector 131 detects input of information used for user authentication or reading of a recording medium on which the information is recorded, target processing corresponding to the detection result may be processing which needs user authentication, and non-target processing may be processing which does not need user authentication. In another example, when the preparation detector 131 detects input of a print instruction, target processing corresponding to the detection result may be print processing, and non-target processing may be processing other than the print processing. In another example, when transmission of facsimile fails, facsimile data may be stored in the storage 112 to re-transmit facsimile data. When the preparation detector 131 detects the stored facsimile data, target processing corresponding to the detection result may be re-transmission processing of the facsimile data, and non-target processing may be processing other than the re-transmission processing of the facsimile data. In another example, when the preparation detector 131 detects contact of a user with a component of the image processing apparatus 110, target processing corresponding to the detection result may be processing using the component, and non-target processing may be processing not using the component. For instance, when the component is a paper feeder that supplies a recording medium such as a sheet of paper, target processing is copy processing and print processing, and non-target processing may be processing other than the copy processing and the print processing. In another example, when the preparation detector 131 detects an operation of a user performed on a component of the image processing apparatus 110, target processing corresponding to the detection result may be processing using the component, and non-target processing may be processing not using the component. For instance, when the component is a finisher, and an operation to open the finisher is detected, target processing may be processing using the finisher, and non-target processing may be processing not using the finisher.

When the preparation detector 131 does not detect preparation of a user, contrary to when preparation of the user is detected, target processing when preparation of the user is detected may be non-target processing, and non-target processing when preparation of the user is detected may be target processing. For instance, when the preparation detector 131 does not detect a document, target processing corresponding to the detection result may be print processing, and non-target processing may be copy processing, scan processing, and facsimile processing. Furthermore, target processing and non-target processing may be determined according to multiple detection results. For instance, when the preparation detector 131 detects a document and a flash memory together, target processing corresponding to the detection result may be scan-memory processing, and non-target processing may be processing other than the scan-memory processing.

3.4. Fourth Modification

In the first exemplary embodiment described above, when an operation using a simple operation image 123 for immediate start corresponding to non-target processing is performed, the steps until the non-target processing is performed may be changed instead of disabling the operation. For instance, when a simple operation image 123 for immediate start corresponding to non-target processing is pressed, similarly to when a simple operation image 122 for non-immediate start is pressed, a confirmation screen is displayed, and after an operation to instruct start of processing is performed in the confirmation screen, non-target processing may be started.

3.5. Fifth Modification

In the exemplary embodiments described above, the display apparatus according to the present disclosure is not limited to the image processing apparatus 110. The display apparatus may be any apparatus as long as the apparatus displays an operation image. For instance, the display apparatus may be a printer, a scanner, a copy machine, or a facsimile which implements some of the functions of the image processing apparatus 110 on a standalone basis, or may be a personal computer, a tablet terminal, or a smartphone.

The steps of processing performed in the image processing apparatus 110 are not limited to the examples explained in the exemplary embodiments described above. The steps of processing may be replaced as long as no contradiction occurs. The present disclosure may be provided as a method including the steps of processing performed in the image processing apparatus 110.

The present disclosure may be provided as a program executed in the image processing apparatus 110. The program may be downloaded via a communication line such as the Internet or may be provided, recorded on a computer-readable recording medium, such as a magnetic recording medium (such as a magnetic tape, a magnetic disc), an optical recording medium (such as an optical disc), a magneto-optical medium, and a semiconductor memory.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A display apparatus comprising:
a displayer that displays on a screen at least one image used for an operation to instruct execution of processing under a predetermined condition;
a preparation detector that detects preparation performed by a user for the processing, wherein the preparation comprises supplying objects or data required for processing to the display apparatus by an operation or an activity of the user; and
a disabling unit that disables a non-target image used for an operation to instruct execution of non-target processing different from target processing corresponding to a result of detection of the preparation detector, the non-target image being of the at least one image displayed on the screen, wherein the at least one image includes a target image used for an operation to instruct execution of the target processing, and the non-target image, and the disabling unit disables an operation of the target image and the non-target image while the screen is scrolled by an operation of the user.

2. The display apparatus according to claim 1,
wherein the disabling unit disables an operation using the non-target image.

3. The display apparatus according to claim 2,
wherein the at least one image includes a target image used for an operation to instruct execution of the target processing, and the non-target image, and
the disabling unit causes the non-target image to be displayed distinctively from the target image.

4. The display apparatus according to claim 3,
wherein the at least one image includes a target image used for an operation to instruct execution of the target processing, and the non-target image, and
the display apparatus further comprises:
an operation detector that detects a situation of operations of the user until an operation using the target image is performed; and
a processing controller that changes steps until the target processing is executed, according to the operation using the target image of the at least one image displayed on the screen, based on the situation of the operations detected by the operation detector.

5. The display apparatus according to claim 2,
wherein the at least one image includes a target image used for an operation to instruct execution of the target processing, and the non-target image, and
the display apparatus further comprises:
an operation detector that detects a situation of operations of the user until an operation using the target image is performed; and
a processing controller that changes steps until the target processing is executed, according to the operation using the target image of the at least one image displayed on the screen, based on the situation of the operations detected by the operation detector.

6. The display apparatus according to claim 1,
wherein the disabling unit controls display of the non-target image to achieve a state in which the non-target image does not accept an operation.

7. The display apparatus according to claim 6,
wherein the disabling unit, after displaying a message indicating that the non-target image is hidden, hides the non-target image.

8. The display apparatus according to claim 7,
wherein the at least one image includes a target image used for an operation to instruct execution of the target processing, and the non-target image, and
the display apparatus further comprises:
an operation detector that detects a situation of operations of the user until an operation using the target image is performed; and
a processing controller that changes steps until the target processing is executed, according to the operation using the target image of the at least one image displayed on the screen, based on the situation of the operations detected by the operation detector.

9. The display apparatus according to claim 6,
wherein the at least one image includes a target image used for an operation to instruct execution of the target processing, and the non-target image, and
the display apparatus further comprises:
an operation detector that detects a situation of operations of the user until an operation using the target image is performed; and
a processing controller that changes steps until the target processing is executed, according to the operation using the target image of the at least one image displayed on the screen, based on the situation of the operations detected by the operation detector.

10. The display apparatus according to claim 1, wherein the at least one image includes a target image used for an operation to instruct execution of the target processing, and the non-target image, and the display apparatus further comprises:

an operation detector that detects a situation of operations of the user until an operation using the target image is performed; and a processing controller that changes steps until the target processing is executed, according to the operation using the target image of the at least one image displayed on the screen, based on the situation of the operations detected by the operation detector.

11. The display apparatus according to claim 10, wherein the situation of the operations is an elapsed time or a number of operations of scrolling the screen until the operation using the target image is performed since the preparation is detected by the preparation detector and when the elapsed time or the number of the operations satisfies a predetermined condition, the processing controller accepts another operation to instruct start of the processing, then starts the target processing.

12. The display apparatus according to claim 1, wherein the at least one image includes a target image used for an operation to instruct execution of the target processing, and the non-target image, and the display apparatus further comprises: an operation detector that detects a situation of operations of the user until an operation using the target image is performed; and a processing controller that changes steps until the target processing is executed, according to the operation using the target image of the at least one image displayed on the screen, based on the situation of the operations detected by the operation detector.

13. A non-transitory computer readable medium storing a program causing a computer to execute a process comprising: displaying on a screen at least one image used for an operation to instruct execution of processing under a predetermined condition;

detecting preparation performed by a user for the processing, wherein the preparation comprises supplying objects or data required for processing to the computer by an operation or an activity of the user; and disabling a non-target image used for an operation to instruct execution of non-target processing different from target processing corresponding to a result of detection of the preparation, the non-target image being of the at least one image displayed on the screen, wherein the at least one image includes a target image used for an operation to instruct execution of the target processing, and the non-target image, and disabling an operation of the target image and the non-target image while the screen is scrolled by an operation of the user.

* * * * *